United States Patent [19]

Gribnau

[11] Patent Number: 5,315,159
[45] Date of Patent: May 24, 1994

[54] WIND TURBINS

[75] Inventor: Wilhelmus H. J. K. Gribnau, Hengelo, Netherlands

[73] Assignee: Holec Projects B.V., Hengelo, Netherlands

[21] Appl. No.: 855,645

[22] PCT Filed: Oct. 12, 1990

[86] PCT No.: PCT/NL90/00153
§ 371 Date: May 6, 1992
§ 102(e) Date: May 6, 1992

[87] PCT Pub. No.: WO91/05953
PCT Pub. Date: May 2, 1991

[30] Foreign Application Priority Data

Oct. 12, 1989 [NL] Netherlands ............ 8902534

[51] Int. Cl.[5] .................. F03D 9/00; H02K 7/18; H02K 41/02
[52] U.S. Cl. .................................................. 290/55
[58] Field of Search ........................................... 290/55

[56] References Cited

PUBLICATIONS

Sears, Zemansky & Young, College Physics, 1985, pp. 606–607, 635–638, 641–642.
Puchstein and Lloyd, Alternating-Current Machines, 1948, pp. 316–317.
Uwe Hansen, Germany Patent 3402035, Jul. 25, 1985, English abstract.
McAllister, Alternating Current Motors, 1909, pp. 74–79.

Primary Examiner—A. D. Pellinen
Assistant Examiner—Robert Lloyd Hoover
Attorney, Agent, or Firm—Watson, Cole, Grindle & Watson

[57] ABSTRACT

Wind turbine for generating electrical energy by means of wind energy, comprising a turbine rotor which can be mounted on a mast and is rotatable about a rotor shaft with one or more rotor blades, and a generator equipped with rotor and stator. The generator is a sector machine of the asynchronous type, the stator of which has one or more discrete stator sectors, and the rotor of which is in a continuous, uninterrupted annular form and is directly coupled to—and has the same angular speed as—the turbine rotor. The one or more discrete stator sectors extend only opposite a small part of the annular generator rotor, of which the rotary movement is always in one direction. Each discrete stator sector comprises two stator halves which are fixed on the legs of a U-shaped holder mounted on the mast and define an air gap between them. Each stator half contains a plate stack with slits for the coil windings, each individual plate of which is a single plate which is a circular segment shape. The annular generator rotor passes continuously into the air gap between the two stator halves of each discrete stator sector.

10 Claims, 10 Drawing Sheets

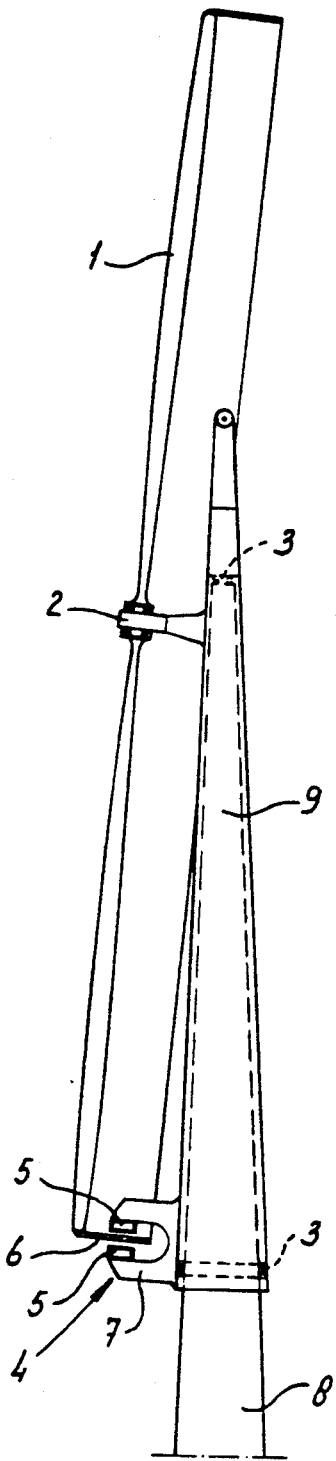 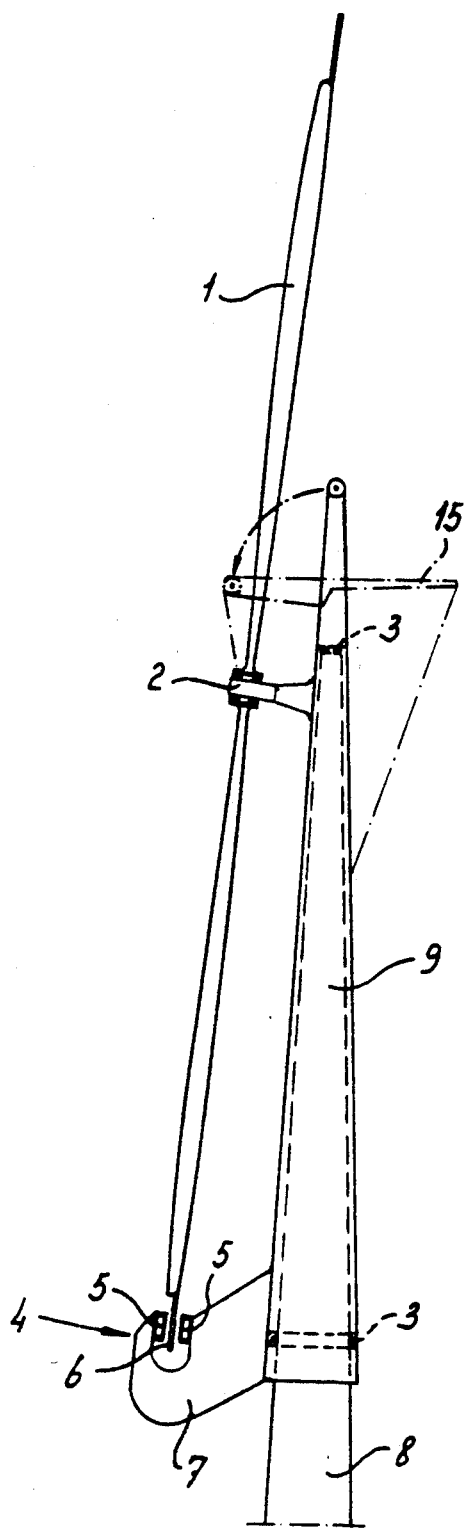

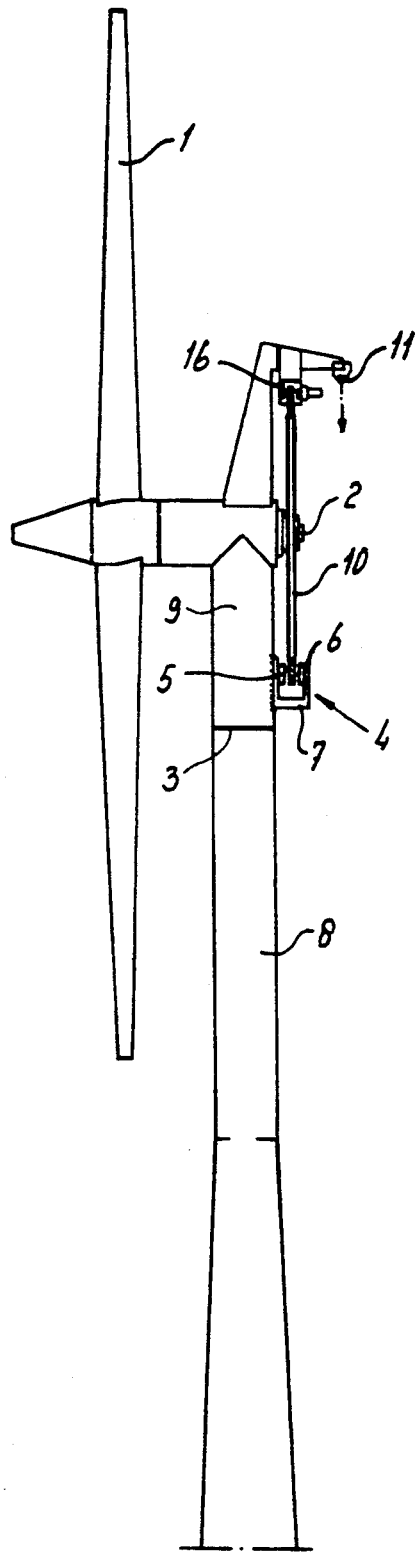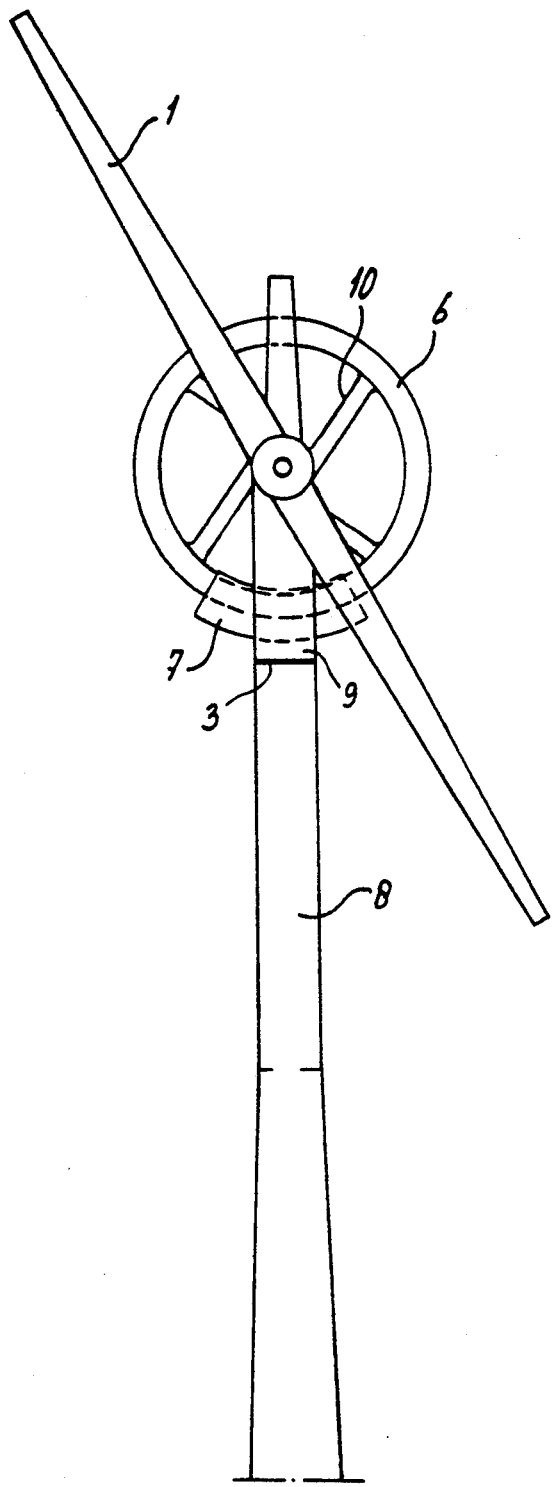

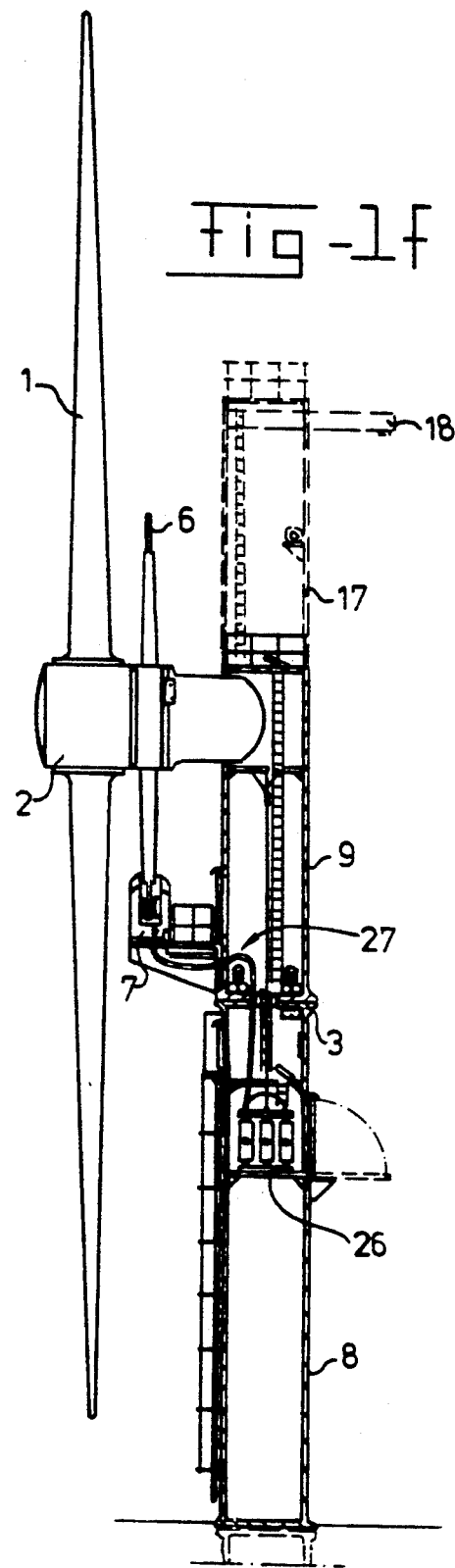

Fig-2a
Fig-2b
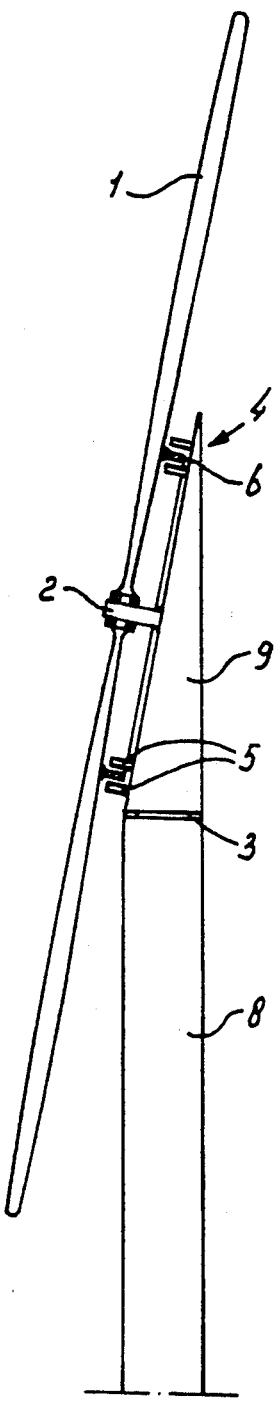
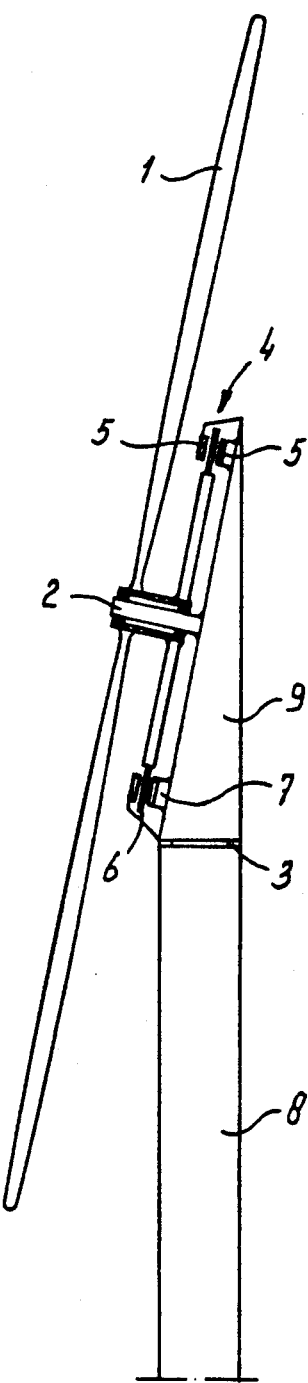

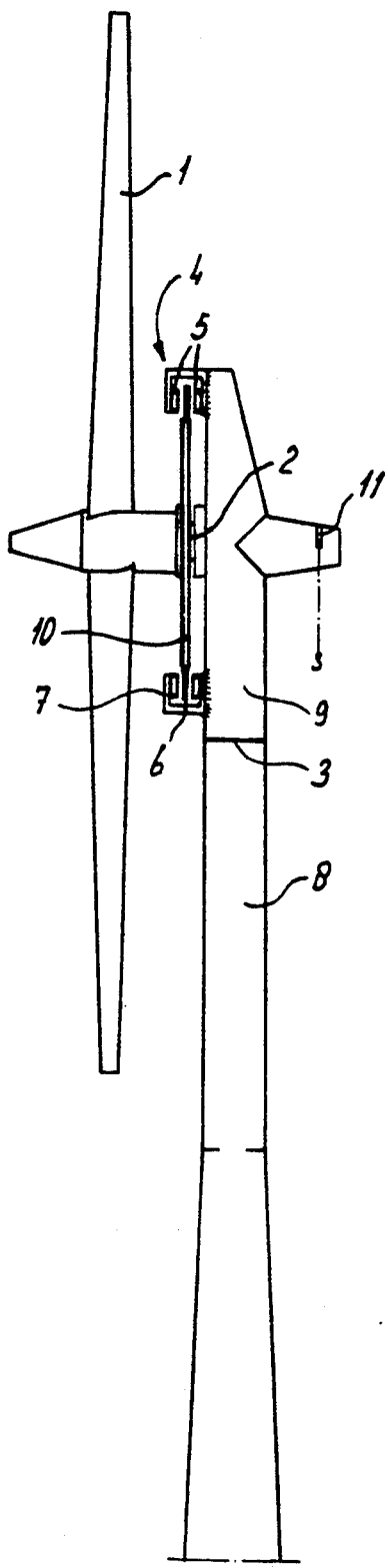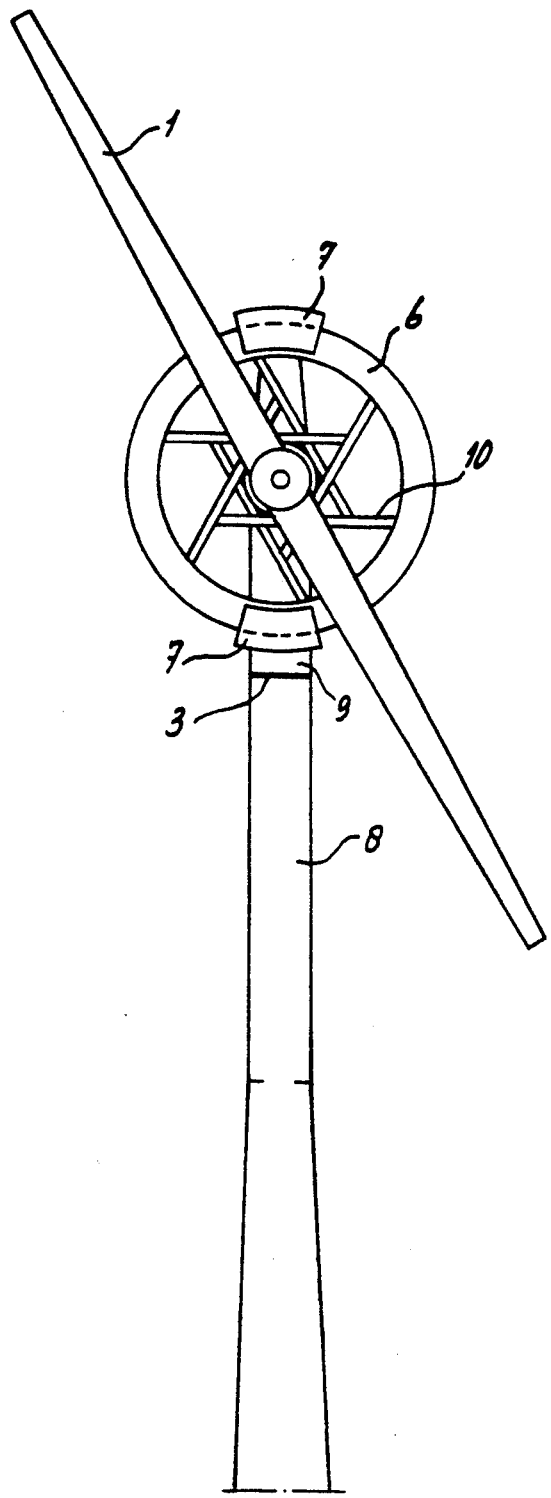

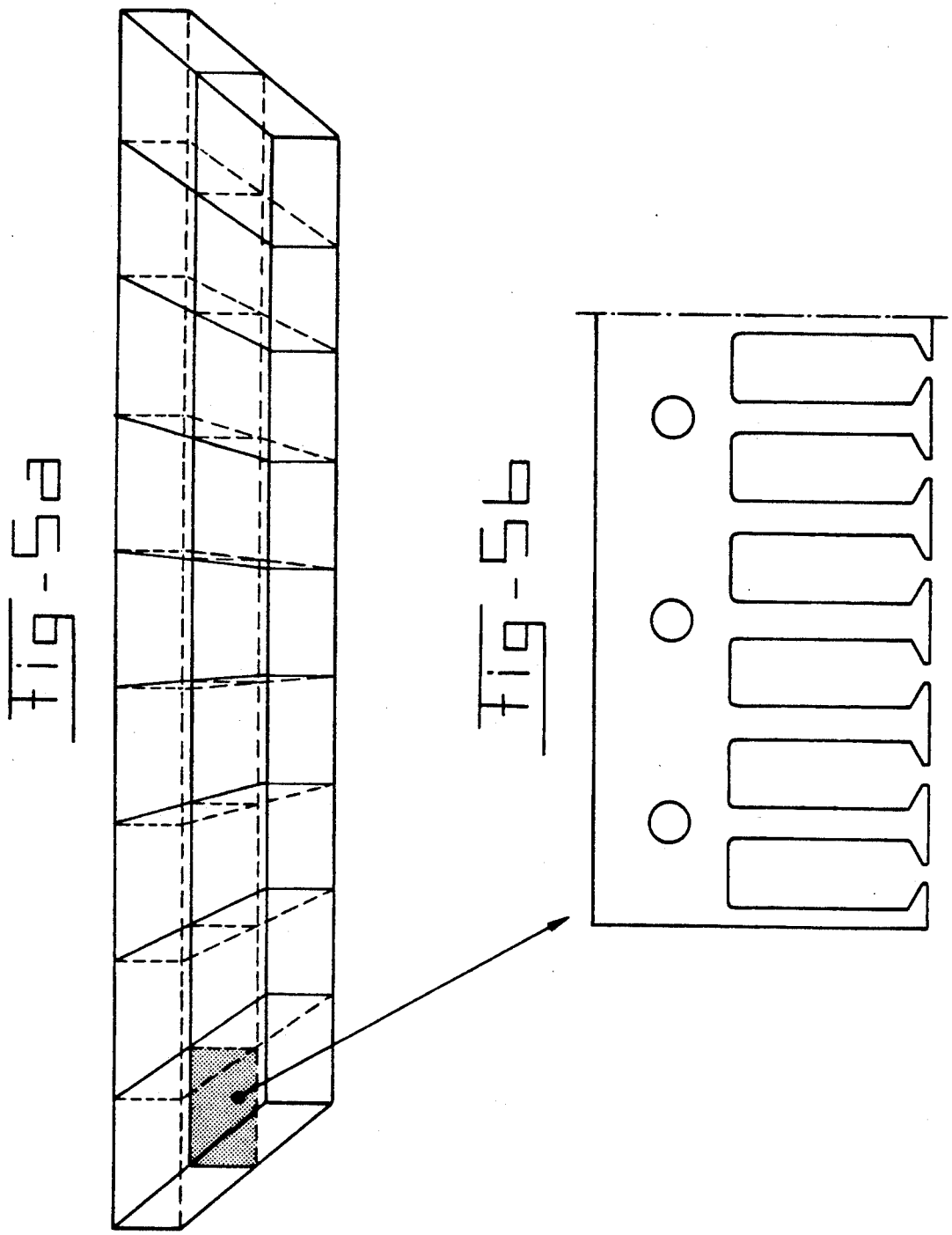

WIND TURBINS

The invention relates to a wind turbine for generating electrical energy by means of wind energy, which wind turbine comprises a turbine rotor which is to be mounted on a mast and is rotatable about a rotor shaft with one or more rotor blades, and a generator equipped with rotor and stator. Such a wind turbine is known in practice, for example from the Holec brochure "Wind turbine type WPS 30-3 for wind farm application", 1987.

For various reasons, including environmental aspects and shortage of energy, wind energy has already been used for a long time now for the supply of electricity in thinly populated areas. The wind turbines used here are being built in increasingly large numbers and sizes. A problem here is the low energy content of the medium air. The power output of a wind turbine is in fact directly dependent on the wind-catching surface of the turbine rotor equipped with one or more blades, so that large turbine rotors have to be used. As a result of the high peripheral speed of the ends of such large turbine rotors, the maximum achievable speed of rotation is limited, inter alia, by material aspects such as strength, material fatigue etc., the shape and number of the rotor blades, and environmental aspects such as noise nuisance. This means that the available speed of ratation on the turbine rotor will be a factor of 10 to 30 times lower than in the case of a conventional generator.

Since the power output of a generator is directly proportional to the speed, measures have to be taken to increase the speed or to adapt the generator to the low speed. This adversely affects the price per unit of power supplied. As a general rule, it can be said that the price per unit of power supplied is related to the weight of the plant, i.e. the heavier the plant, the higher the price of the power supplied. In order, nevertheless, to be able to work with conventional high-speed generators and to obtain a reasonable power output, in the state of the art many wind turbines are coupled by means of intermediate shafts, geared transmissions, couplings and brakes to these high-speed generators. In this way the low speed of rotation of the wind turbine is adapted by means of a mechanical gear or up-converter to the much higher speed of rotation of the standard three-phase generator. The above-mentioned conversion components are generally accommodated in a heavy and bulky gondola on the top of the mast for the wind turbines.

In particular in the case of wind turbines for greater outputs, for example above 100 kW, it has been found in practice that in operation they are highly susceptible to serious defects and require frequent maintenance. The susceptibility to faults of the above-mentioned conversion train (turbine rotor, shafts, intermediate shafts, couplings, gearbox, brake and generator) has become increasingly clear. The complexity of the conversion train makes this train sensitive to the difficult conditions of wind turbine operation, such as vibrations, resonances, great force and couple variations.

In order still to achieve the same power output at low speeds of wind turbines without conversion by means of a whole conversion train, the generator can also be adapted. This can be achieved by, for example, increasing the number of poles in the generator. This leads in turn to an increase in the dimensions of the generator. German patent publications DE-3629872 A1 and DE-3638129 A1 give examples of a wind turbine in which a generator with a large number of poles and therefore large diameter is integrated in the tower structure. This generator is driven directly by the wind turbine in this case. The generator concerned here is of the synchronous type with permanent magnets, and built in the conventional manner as a round, rotationally symmetrical ring machine. Such a machine has, however, as disadvantages the use of expensive magnets and the large diameter of the stator on which, as a result of the low angular speed of the wind turbine with high pole number, they have to be designed. As a result of the large diameter and relatively low axial length of the stator, these machines are expensive, and are mechanically fragile, due to their lack of adequate round rigidity.

The object of the invention is to eliminate the above-mentioned problems and provide a wind turbine which is a strong, simple design without conversion train, and is thereby more reliable and easier to maintain, and has a long service life.

This is achieved according to the invention in a wind turbine of the type mentioned in the preamble in that the generator is a sector machine of the asynchronous type, of which the stator comprises one or more discrete stator sectors, and of which the rotor is in a continuous, uninterrupted annular form and is directly coupled to the turbine rotor, one or more discrete stator sectors extending only opposite a small part of the annular generator rotor, of which the rotary movement is always in one direction. The above-mentioned generator rotor can be in the form of a ring lying at right angles to the plane of the turbine rotor blades or a flat ring, i.e. open disc, extending in—or parallel to—the plane of the turbine rotor blades.

According to the invention, use is made of a sector machine of which the one or more discrete stator sectors are of compact construction, and in which the generator rotor coupled directly to the turbine rotor can be produced with a freely selectable large diameter. In this way a high peripheral speed with low angular speed, i.e. with low speed of rotation, can be obtained. If the rotor diameter is selected larger, the stator can be selected smaller for generation of still the same amount of power. The invention makes use of a sector machine of the asynchronous type. This makes a simple and robust annular construction of the generator rotor possible. This rotor can be made of a relatively cheap electrically conducting material. Due to the fact that the rotor diameter can be large, the air gap in the discrete stator sectors comprising two stator halves can also advantageously be greater.

Another advantage obtained is that, due to the fact that an asynchronous machine which is inherently robust is used for the generator, the exciter(s), excitation system, regulator(s) and slip rings or rotary rectifiers normally used are absent. This asynchronous machine can also advantageously be used as a brake by means of direct current or capacitor excitation on one or more stator phase windings. When, for example, a vertical shaft turbine is initially started up, the asynchronous machine as motor can run the wind turbine up to full speed from the stationary position. The asynchronous sector generator also naturally has a great slip, so that the rotational speed dynamical behaviour of the windmill is better. For the removal of frost and/or ice, the generator stator as a rotor at stand still can be heated up by means of intermittent or reverse switching on. The above-mentioned stator windings are connected to a three-phase transformer generally fitted at the bottom in the mast of the wind turbine. This transformer is connected, for example, to the mains for the supply of power thereto or, in the event of e.g. starting up from a stationary position, for taking supply therefrom.

As a result of the direct coupling between turbine rotor and generator, the mechanical gear or up-converter with their couplings and intermediate shafts are not needed. This greatly improves the reliability of the wind turbine, so that the use of wind energy with the aid of this wind turbine for the generation of electrical energy has become commercially attractive.

The above-mentioned design of the generator as a sector machine of the asynchronous type corresponds to the principle of a linear machine. Although this principle has already been known for a long time, the use of linear machines for outputs above 100 kW has remained limited purely to the field of motors for driving or traction, where stator and rotor move linearly along each other. For a wide use of these drive motors, a number of problems have proved extremely irksome, namely the high starting propelling forces, the magnetic floating of the driven device and the required high speeds, and the supply of such high energies at the above-mentioned high speeds and current intensities by means of current supply wire or current collecting rails is a great problem. There is hardly any mention of the use of a linear machine as generator. It is true that a linear generator is known from U.S. Pat. No. 4,500,827, but its use is limited solely to a generator of which rotor and stator move linearly along each other. The constant to and fro movement means that the efficiency is low, while high speeds and therefore a high power output are not possible.

With the generation of electrical energy in the manner of a generator according to the invention coupled to a wind turbine there is no energy loss through reversal of the movement, and very high speeds of the rotor relative to the stator are possible. The direct coupling to the turbine rotor also means that there are no conversion losses. The efficiency and also the power output are thereby improved. With regard to the use of traction, the problem of the currant take-off does not exist here either, because the machine winding can be connected directly to the output terminals.

German Offenlegungsschrift DE-3402035 A1 discloses a wind turbine with a turbine rotor and a generator equipped with rotor and stator which generator is also a sector machine. The stator in this case comprises one discrete stator sector of which the three-phase current windings, as stated on page 5, can be designed either in a delta connection or in a star connection. This is possible only in the case of a linear machine of the synchronous type. As is known, a synchronous linear machine, just like the ordinary rotationally symmetrical (synchronous and asynchronous) machine, has in fact a virtually constant air gap induction, as a result of which both Y and Δ connections of the stator windings are possible.

In the case of a linear induction machine, such as a generator with sector-type stator of the asynchronous type, as in the case of the present application, the magnetic induction in the air gap is built up only gradually, so that the voltages induced in the coils of the stator windings differ greatly from place to place. Added over the series-connected poles, the total induced voltages in the three-phase windings become also unequal. This asymmetry in the voltages produces not only a system of homopolar voltages, as a result of which the phase windings in the stator cannot be delta connected, but also a system of inverse voltages. Conversely, in the case of supply from a symmetrical three-phase network of which the phase voltages form a symmetrical system, a system of inverse currents also occurs. The size of these inverse currents depends on the length of the machine and the slip in the operation point concerned. All this is as mentioned in various publications, such as the manual "Drehstromiinear-motoren", 3rd revised edition, Dr. Alfred Hüthig Verlag, Heidelberg, by Prof. Peter-Klaus Budig.

The fact that the above-mentioned Offenlegungsschrift is concerned only with a generator of the synchronous type also emerges from FIGS. 1 and 3, in which the rotor disc is equipped with permanent magnets and is therefore a machine of the synchronous type.

The invention will be explained in greater detail with reference to a number of examples of embodiments shown in the drawings, in which the same parts in the different figures are indicated by the same reference numbers, and in which:

FIGS. 1a to 1f show examples of embodiments of a wind turbine according to the invention of the horizontal shaft type with two stator sectors;

FIGS. 2a to 2d show examples of embodiments of a wind turbine according to the invention of the horizontal shaft type with two stator sectors;

FIGS. 5a and 5b show a view of a plate stack from a stator half of FIG. 4 and of a single plate.

Figure 1C:
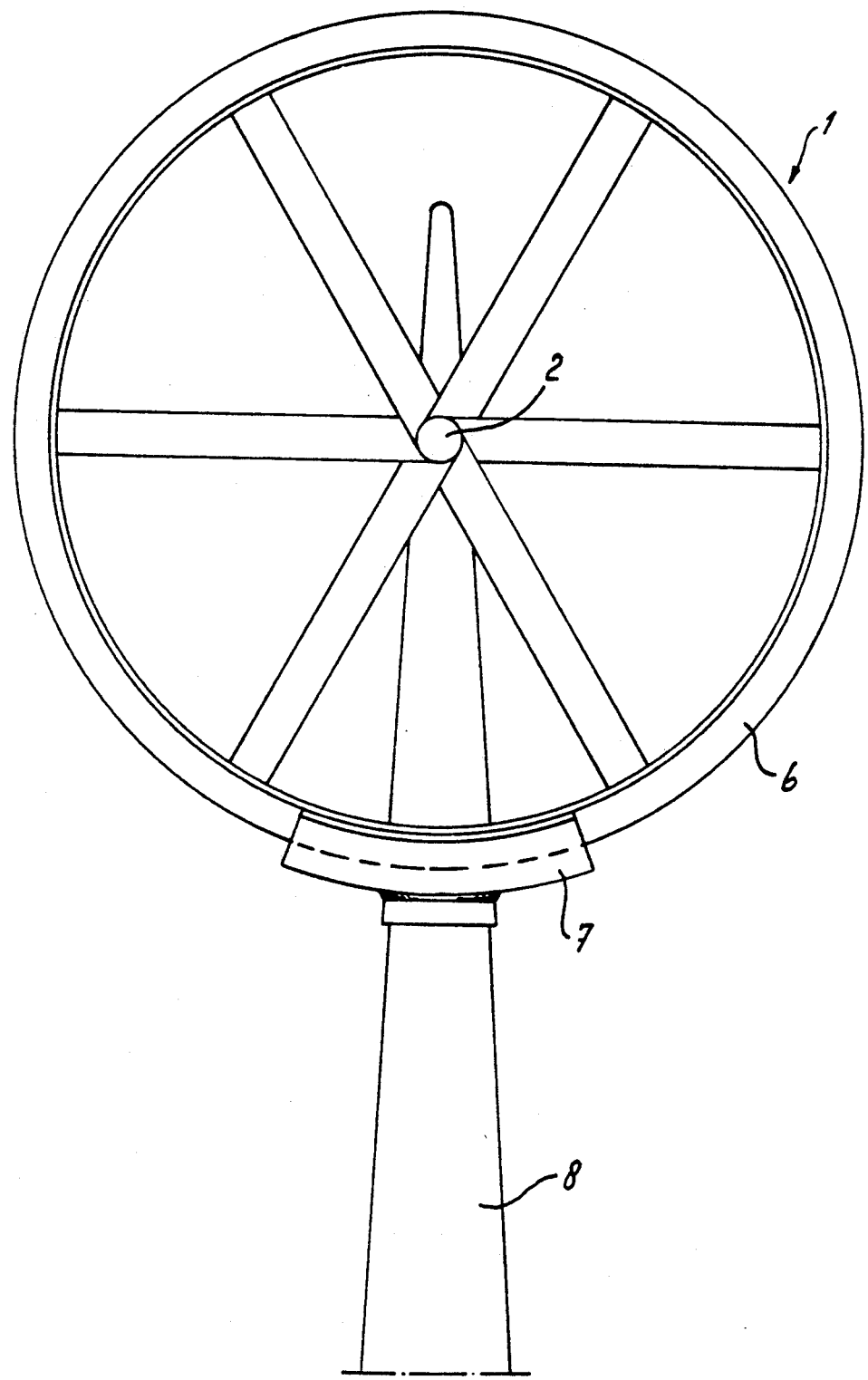

In the examples of embodiments shown in FIG. 1 the wind turbine rotor 1 is fixed by means of a shaft 2 on a turbine mast or tower 8. In the case of this wind turbine of the horizontal shaft type the generator rotor 6, in the form of a ring, is fitted, for example, near or at the end of the rotor blades. In FIG. 1a this ring is fitted at an angle which is generally a right angle relative to the plane of the rotor blades or vanes 1. In FIG. 1b ring is fitted as a flat ring, i.e. an open disc, on the end of the blades in the same plane thereof. The generator, indicated in its entirety by 4, has in addition to the above-mentioned rotor 6 one or more discrete stator sectors each made up of two stator halves 5. These stator halves 5 are fixed by means of a U-shaped holder or "cradle" 7 to the rotary or turnable part 9 of the mast 8. A bearing of this turnable part of the mast 8 is indicated by 3. A hoisting device integrated in the mast is indicated by 15.

Since in FIGS. 1a and 1b the annular rotor 6 is fixed at the end of the turbine rotor 1, this rotor will have a high peripheral speed or linear passing speed, and one discrete stator sector will be sufficient. It is clear that the U-shaped holder 7 of the stator sector(s) with associated stator halves and air gap in the construction is adapted to the horizontal and vertical position of the ring according to FIGS. 1a and 1b. FIG. 1c shows a front view of a possible embodiment with a turbine rotor comprising six blades and a flat ring, i.e. open disc, fitted at the ends of the blades, as generator rotor and a single discrete stator sector of the generator.

FIGS. 1d and 1e show yet another embodiment, in which the annular generator rotor 6 is rigidly coupled to the shaft 2 of the turbine rotor 1 by a rotary disc 10 of open construction suitable for the purpose. The diameter of the generator rotor is in this case smaller than the diameter of the turbine rotor. Here again the peripheral speed of the generator rotor 6 is sufficient to make use again of a single stator sector accommodated in a U-shaped holder 7. In this example, a hoisting point 11 can also be used, and a brake can be accommodated in the holder 16 lying at the top.

FIG. 1f shows an example of an embodiment of a wind turbine of the horizontal shaft type with a generator rotor 6 of smaller diameter. In this embodiment the way in which the shaft stub end of the turbine rotor 1 and of the generator rotor 6 is accommodated and bearing-supported in the top side of the mast can be seen clearly. Since the gondola for the usual converter, geared transmission and the like from the state of the art is now omitted, space has now become available for a separate tower part 17 with a hoisting unit 18. This hoisting unit, which in the state of the art was virtually impossible, can be used with particularly great advantage during the installation of the wind turbine on the mast and for any subsequent repairs. This means that the use of a hoisting gantry on a special ship or a large hoisting crane is no longer necessary. The turning mechanism is again indicated by 3.

FIG. 1f also shows connections, or leads, 27 which act as leads of the stator windings. The leads 27 are connected to each stator half in the U-shaped holder 7 and a three-phase transformer FIGS. 2a and 2b show examples of embodiments of a wind turbine of the horizontal shaft type in which also compared with FIGS. 1a to 1c the generator rotor 6 has a smaller diameter than the periphery of the turbine rotor 1. Since the peripheral speed or linear speed here is lower than in the case of the examples of FIG. 1a to 1c, two discrete stator sectors used here in U-shaped holders. If necessary, more sectors can be provided. In FIG. 2a the generator ring 6 is fixed directly to the rotor blades 1. In FIG. 2b the flat ring of the generator rotor 6, again on a separate open disc construction, is coupled directly to the shaft of the rotor turbine. FIGS. 2c and 2d show a side view and a front view respectively of a variant of an embodiment of the generator rotor 6, which is fixed separately on the shaft 2 of the turbine rotor, again by means of an open disc-type structure 10. A hoisting point is again indicated by 11.

Figure 3A:
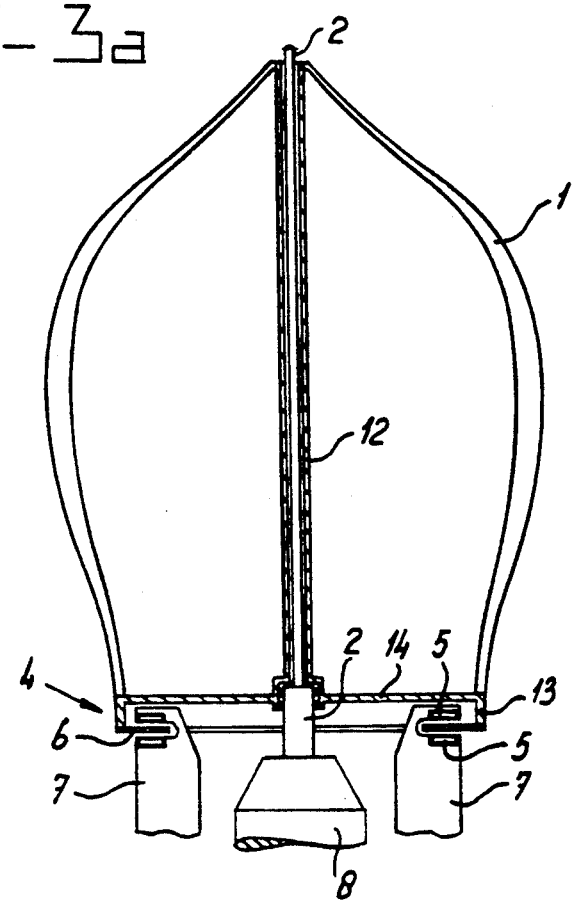
FIGS. 3a and 3b show examples of embodiments of a wind turbine according to the invention of the vertical shaft type with at least two stator sectors.
Figure 3B:
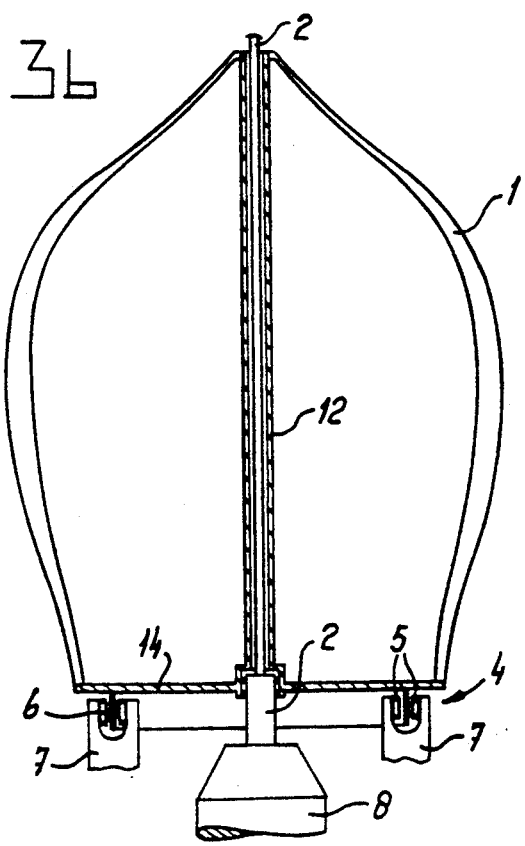

FIGS. 3a and 3b show two examples of embodiments of a wind turbine of the vertical shaft type with two or more associated turbine blades of known form. These blades are fixed to the turbine tube 12. The rotor blades 1 rotating about the shaft 2 on the mast 8 are firmly fixed at the bottom side to an open, horizontal, jointly turning rotor blade supporting structure 14. In FIG. 3a the annular generator rotor is in the form of a flat ring or open disc 6 fitted on a flanged edge 13 on the end of the rotor blade supporting structure 14. In FIG. 3b this annular generator rotor is in the form of a ring projecting vertically downwards. The stator sectors used here extend horizontally in the case of FIG. 3a and vertically in the case of FIG. 3b.

Figure 4A:
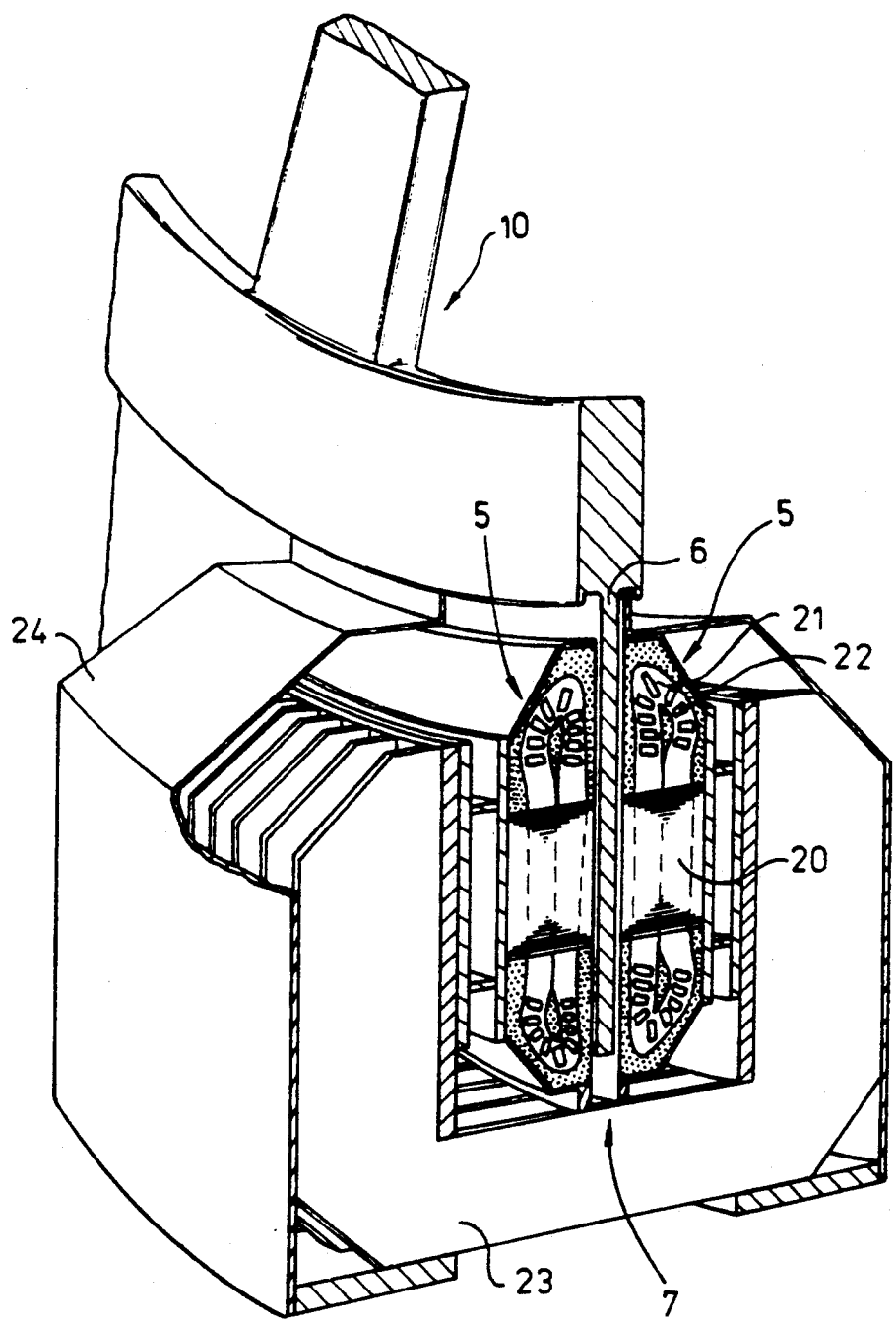
FIGS. 4a and 4b show a cross sectional view of a stator sector for use in the wind turbine from FIGS. 1 to 3, and a perspective view of a portion of a stator half, respectively.
Figure 4B:
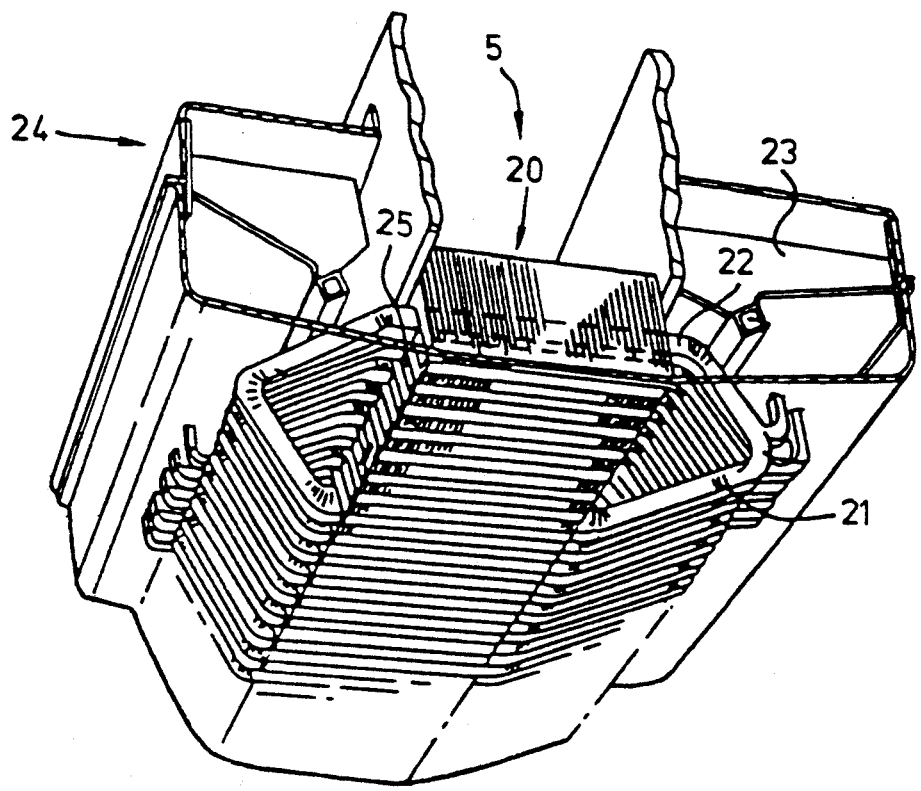

FIGS. 4a and 4b show a cross sectional view of a sector stator and a perspective view of a portion of a stator half, respectively, in a wind turbine of the horizontal shaft type. The spoke-type structure and the rotor disc belonging to the wind turbine are indicated in FIG. 4a by 10 and 6 respectively. The stator accommodated in the U-shaped holder 7 is again made up of the two stator halves 5. The plate stacks 20, the coil heads 21 of the coil windings, which windings are taken up in the plate slits 25 and the coil sides 22 are shown in each stator half 5. The coil heads are embedded in resin (hatched). Reinforcement ribs 23 are fitted on either side of the stator halves 5, and the whole unit is enclosed by an external housing 24. As can be seen from FIGS. 4a and 4b, the stator is a curved or circular segment shape. The plate stack provided in each stator half is in the form of a circular segment, the individual plates of which are also in circular segment form and each comprise a single plate provided with slits 25.

FIG. 5a shows such a plate stack 20 in extended form, and FIG. 5b shows a part of one of the plates from this plate stack 20, namely the part whose length corresponds to one pole pitch, as indicated in each case in FIG. 5a by the cross sectional planes shown by dotted lines.

For such a wind turbine with a generator as a sector machine of the asynchronous type for the generation of an output of 550 kW the following data apply:
diameter of turbine rotor: 35 m
shaft height: 40 m
wind speed: 5–25 m/s
output: 550 kW
diameter of generator rotor: 10 m
speed of rotation: 40 r.p.m.

Although the above-mentioned turbine is described in its embodiment for a wind application, it goes without saying that this turbine can also be used with other forms of motion energy for conversion into electrical energy. For example, it is conceivable for this turbine to be used in water flows.

I claim:

1. A wind turbine for generating electrical energy by means of wind energy, comprising: a turbine rotor mountable on a mast and being rotatable about a rotor shaft with one or more rotor blades, and a generator of the asynchronous sector machine type equipped with a generator rotor directly coupled to the turbine rotor in the form of a continuous, uninterrupted annular ring of electrically conductive material, and one or more discrete stator sectors, the one or more discrete stator sectors extending along a portion of the annular generator rotor on opposite sides thereof.

2. Wind turbine according to claim 1, in which the one or more discrete stator sectors each comprise two stator halves (5) which are fixed on the legs of a U-shaped holder (7) mounted on the mast (8) and define an air gap between them, each stator half (5) containing a plate stack (20) with slits for the coil windings, each individual plate of which is a single plate which is a circular segment shape, while the annular generator rotor passes continuously into the air gap between the two stator halves of each discrete stator sector (FIG. 4 and 5).

3. Wind turbine according to claim 2, being of a horizontal shaft type, and the generator rotor (6) forms a ring standing out at right angles to the essentially vertical plane of the turbine rotor blades (10), and the U-shaped holder (7) of each discrete stator sector grips round the ring in the essentially horizontal plane.

4. Wind turbine according to claim 3, in which the annular generator rotor (6) is fitted on or near the end of the rotor blades (10).

5. Wind turbine according to claim 3 wherein the annular generator rotor (6) is fitted on the turbine rotor shaft at a distance from the turbine rotor and has a diameter smaller than the diameter of the turbine blades.

6. Wind turbine according to claim 2, being of a horizontal shaft type, and the generator rotor (6) forms a flat ring extending in the essentially vertical plane, and the U-shaped holder of each discrete stator sector grips round the flat ring in the essentially vertical plane.

7. Wind turbine according to claim 2, being of a vertical shaft type, and the turbine blades are of a shape which is known per se, extending from the top of the turbine rotor sideways and downwards, while the ends of the turbine blades are connected by a generally open rotor blade supporting structure (14) to the shaft (2) of the turbine rotor, and the annular generator (4) rotor is fixed on or near the periphery of the rotor blade and supporting structure at the bottom side thereof.

8. Wind turbine according to claim 7, in which the annular generator rotor (6) projects downwards as a ring from the rotor supporting structure, and the U-shaped holder (7) of each discrete stator sector grips round the ring in the vertical plane.

9. Wind turbine according to claim 7, in which the annular generator rotor (6) is in the form of a flat ring fitted on a flanged edge of the rotor blade supporting structure and extending parallel thereto, and the U-shaped holder (7) of each discrete stator sector grips round the flat ring in the horizontal plane.

10. Wind turbine according to claim 1, wherein the rotor shaft (2) of the wind turbine is bearing-supported by a shaft stub end in the mast, and a mast part (17) with a hoisting device (18) is provided above the bearing.

* * * * *